United States Patent [19]
Spradlin

[11] Patent Number: 5,946,623
[45] Date of Patent: *Aug. 31, 1999

[54] SYSTEM AND METHOD FOR ROUTING A WIRELESS TELECOMMUNICATIONS CALL

[75] Inventor: Steven D. Spradlin, Chicago, Ill.

[73] Assignee: S Squared, L.L.C., Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/609,639

[22] Filed: Mar. 1, 1996

[51] Int. Cl.⁶ .................................................. H04Q 7/00
[52] U.S. Cl. ........................................ 455/445; 455/414
[58] Field of Search .................................. 455/414, 455, 455/432, 433, 422, 436, 435, 437, 404, 405, 439; 370/331

[56] References Cited

U.S. PATENT DOCUMENTS

| | | | |
|---|---|---|---|
| 5,187,710 | 2/1993 | Chau et al. | 370/110.1 |
| 5,272,748 | 12/1993 | Davis | 379/63 |
| 5,287,403 | 2/1994 | Atkins et al. | 379/144 |
| 5,319,699 | 6/1994 | Kerihuel et al. | 455/445 |
| 5,321,737 | 6/1994 | Patsiokas | 455/414 |
| 5,335,265 | 8/1994 | Cooper et al. | 379/59 |
| 5,339,352 | 8/1994 | Armstrong et al. | 455/414 |
| 5,369,684 | 11/1994 | Buhl et al. | 455/432 |
| 5,388,148 | 2/1995 | Seiderman | 379/59 |
| 5,420,910 | 5/1995 | Rudokas et al. | 379/59 |
| 5,440,614 | 8/1995 | Songberg et al. | 455/413 |
| 5,446,553 | 8/1995 | Grube | 455/432 |
| 5,457,680 | 10/1995 | Kamm et al. | 455/432 |
| 5,526,402 | 6/1996 | Dent et al. | 455/426 |
| 5,539,744 | 7/1996 | Chu et al. | 370/397 |
| 5,541,977 | 7/1996 | Hodges et al. | 455/411 |
| 5,557,652 | 9/1996 | Jonsson | 455/411 |
| 5,577,103 | 11/1996 | Foti | 455/412 |
| 5,594,782 | 1/1997 | Zicker et al. | 455/417 |
| 5,633,868 | 5/1997 | Baldwin et al. | 455/436 |

OTHER PUBLICATIONS

CTIA, Fraud Containment News, Jun. 1996 Issue, Entire issue may be pertinent.

*Primary Examiner*—Dwayne D. Bost
*Assistant Examiner*—Jean A. Gelin
*Attorney, Agent, or Firm*—Covington & Burling

[57] ABSTRACT

This invention provides a system and method for routing a call from a wireless telecommunications unit for service and information. The system and method are especially useful and effective for service and information calls from wireless telecommunications that are roaming outside their home service areas. The invention allows a user of a wireless telecommunications unit to input a predetermined code, into the unit and to be connected automatically to a home service location associated with the unit. The system of the present invention includes a wireless telecommunications unit, a telecommunications system serving that unit, a routing system and means for establishing an end-to-end communications path between the wireless telecommunications unit and the home service location. The system of the present invention may also include means for informing the home service location of the location of the wireless telecommunications unit. The method of the present invention includes the steps of inputting a predetermined code into a wireless telecommunications unit; transmitting to a telecommunications system serving the unit a signal corresponding to the predetermined code and information that identifies the unit and associates the unit with a home service location; transmitting the unit identification information to a routing system; evaluating the identification information according to predetermined criteria, such as whether the home service location is served by the routing system; and, if the unit identification information meets the predetermined criteria, establishing an end-to-end communications path between the wireless telecommunications unit and the home service location.

60 Claims, 2 Drawing Sheets

SYSTEM AND METHOD FOR ROUTING A WIRELESS TELECOMMUNICATIONS CALL

BACKGROUND OF THE INVENTION

This invention relates to the routing of a wireless telecommunications call, and more particularly to the routing of a wireless telecommunications call from a wireless telecommunications unit to a service destination—i.e., a destination for service or information, or both.

DESCRIPTION OF THE RELEVANT ART

Wireless telecommunications technology and services are becoming increasingly prevalent. Today, wireless telecommunications services available to the public include, for example, paging services, cellular mobile telephone services, as well as emerging personal communications services and mobile satellite services.

In many applications, a subscriber to a wireless telecommunications service is equipped with a wireless telecommunications unit that provides the capability for mobile telecommunications—that is, the wireless telecommunications unit can be carried by the user or can be mounted in a car, truck or other vehicle. In other applications, the wireless telecommunications unit may be at a fixed location, either temporarily or permanently. Wireless telecommunications units may be equipped to transmit and receive voice communications, data communications, or both.

A user of wireless telecommunications services usually receives the service by contracting with a service provider that operates a wireless telecommunications system. The system with which the user contracts or subscribes is typically known as the user's home wireless telecommunications system. This home system for example may provide the subscriber with access to the wireless telecommunications service, and may provide a wide variety of services such as billing and collection for wireless telecommunications services; arrangements for telecommunications services such as long distance services or others interconnected with the home wireless system; assistance with the operation of the subscriber's wireless telecommunications unit; information on rates, system coverage, dialing patterns, and billing issues; and guidance on how to obtain various services in connection with the system serving the wireless telecommunications unit. The service location could also function as a corporate communications center or a gateway between the wireless telecommunications unit user and a broad range of telecommunications and information services.

In many applications, a home wireless telecommunications system provides wireless telecommunications services in a geographic area. In cellular telecommunications in the United States, for example the geographic areas served by cellular systems approximately correspond to Metropolitan Statistical Areas as determined by the Bureau of the Census and as set forth in the rules of the Federal Communications Commission. In personal communications services in the United States, as another example, system service areas approximately correspond to Metropolitan Trading Areas or Basic Trading Areas as set forth in the rules of the Federal Communications Commission, depending on the frequency band used for the wireless portion of the service.

A home wireless telecommunications system typically provides subscribers with the ability to establish a communications path between the subscriber's wireless telecommunications unit and a telecommunications switch included in the home system's facilities. This communications path typically includes a wireless telecommunications path between the subscriber's wireless telecommunications unit and a fixed station, usually known as a base station. In a two-way wireless communications system, such as a cellular mobile telephone system, a base station receives wireless communications from and transmits wireless communications to the subscriber's wireless telecommunications unit. The base station also interconnects with other telecommunications facilities to establish a communications path between the wireless telecommunications unit and the telecommunications switch. The telecommunications switch of the system, in turn, may be connected to other communications facilities to establish communications paths between the wireless telecommunications unit, in some cases via the home system telecommunications facilities, and other telecommunications units—wireless or non-wireless, mobile or fixed—operating within the home telecommunications system or in connection with other telecommunications systems. These other telecommunications systems could include, by way of example, local exchange or other wireless telecommunications systems operating in the same geographic area served by the home wireless system, as well as telecommunications systems operating in other areas of the same country or in other countries.

When a wireless telecommunications unit is operated in a geographic area outside the area served by its home system, it is typically said to be roaming. In order for roaming to occur, a system in whose geographic area the wireless telecommunications unit is operating, and which is capable of communicating with the unit, must agree to provide service to the wireless telecommunications unit. This agreement may be reached, for example, when the user of the unit attempts to make a call in an area outside the unit's home system. In this example, when a wireless telecommunications unit is activated, for instance when a "send" key is depressed, the unit transmits information that identifies the individual unit as well as the unit's home system. The system serving the unit, sometimes referred to as the foreign system or serving system, receives this identifying information, recognizes that the unit is roaming, and either directs the user to call another number in order to establish a basis for paying the charges for the call, or diverts the call to a destination with which the user can communicate in order to establish a basis for paying the charges for the call. Such bases may include billing the charges for the call to a credit card account, a calling card account, a third-party number, or to the number being called (i.e., a collect call). These are some of the ways in which the wireless telecommunications system serving the wireless telecommunications unit can be assured that it will be compensated for its charges for handling calls originated by roamers.

Another approach to handling roamers is for the foreign system serving the wireless telecommunications unit to have a roaming agreement with the home telecommunications system of the wireless telecommunications unit. In this approach, when the roaming wireless telecommunications unit attempts to make a call, the foreign system handles the call as if it were the home system for the wireless telecommunications unit—that is, there would be no interception or diversion of the call. The foreign system serving the wireless telecommunications unit would, for example, bill its appropriate charges to the home telecommunications system, which would then charge the subscriber through the home-system billing process.

Problems may still arise, however, when a roaming user of a wireless telecommunications unit attempts to make a call. For example, the dialing pattern for making long distance or collect calls may be different in the subscriber's home system than in the foreign system.

These problems may be compounded in the context of calls for service or information. Such calls may be prompted for example by a user's difficulty in using a foreign system, by difficulties in operating a wireless telecommunications unit, by questions about service features and options, by questions about charges and billing arrangements, by the need to access other telecommunications or information services, and the like. In some cases, the number to dial for service or information in the foreign system may be different from the number to dial for service or information in the home system of the wireless telecommunications unit. Even if the numbers to call are the same in the foreign and home systems, the service or information personnel of the system serving the wireless telecommunications unit may not be familiar with the particular wireless telecommunications unit being used by the subscriber. In addition, the foreign system may have been directed by the wireless telecommunications unit's home system to limit or deny service to the unit for example because of concerns about fraudulent calls from the unit or billing issues between the home system and the unit's subscribers. In such cases, the service personnel of the foreign system may not be familiar with the reasons for the limitations or denial of service. Indeed, it would be unlikely for the service or information personnel of the foreign system serving the roaming unit to have the same information about the roaming subscriber, such as the subscriber's billing history or service options and preferences, that service or information personnel of the subscriber's home system would have readily available in responding to a service or information call.

In addition, even if the call for service or information by a roaming user were successfully routed to a service or information location associated with the home system of the wireless telecommunications unit, the home system service or information location typically is not informed of the location of the wireless telecommunications unit. As a consequence, the home system service or information location would not for example know the identity of the wireless telecommunications system serving the wireless telecommunications unit, and thus may not have full information about the circumstances, such as difficulty with the dialing pattern for a long distance or other kind of call, that gave rise to the call for service or information.

SUMMARY OF THE INVENTION

An object of the invention is to provide a system and method for facilitating service or information, or both, for wireless telecommunications subscribers.

Another object of the invention is to provide a system and method for unintrusively and seamlessly routing a call for service from a wireless telecommunications unit.

A further object of the invention is to provide a system and method for unintrusively and seamlessly routing a call from a roaming wireless telecommunications unit to a home service location of the wireless telecommunications unit.

Another object of the invention is to provide a system and method for informing a service location associated with a roaming wireless telecommunications unit calling for service or information of the geographic location of the wireless telecommunications unit.

The present invention, as broadly described herein, provides a system comprising a combination of elements for routing a wireless telecommunications call including a wireless telecommunications unit, a telecommunications system serving the wireless telecommunications unit, a routing system, and a means for establishing an end-to-end communications path between the wireless telecommunications unit and a home service location associated with the wireless telecommunications unit. The invention allows a user of the wireless telecommunications unit to input a predetermined code such as "*611" into the wireless telecommunications unit and to be connected with the home service location associated with the unit. As broadly described herein, the system of the present invention may also include means for informing the home service location of the location of the wireless telecommunications unit.

The present invention, as broadly described herein, also provides a method for routing a wireless telecommunications call, including the steps of inputting a predetermined code into a wireless telecommunications unit; transmitting to a telecommunications system serving the unit a signal corresponding to the predetermined code and information that identifies the unit and associates the unit with a home service location; transmitting the unit identification information to a routing system; evaluating the identification information according to predetermined criteria, such as whether the home service location is served by the routing system; and, if the unit identification information meets the predetermined criteria, establishing an end-to-end communications path between the wireless telecommunications unit and the home service location. As broadly described herein, the method of the present invention may also include the step of signalling the home service location with information on the location of the wireless telecommunications unit.

Additional objects and advantages of the invention are set forth in part in the description which follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

DETAILED DESCRIPTION OF THE PREFERRED EMBODIMENTS

Figure 1:
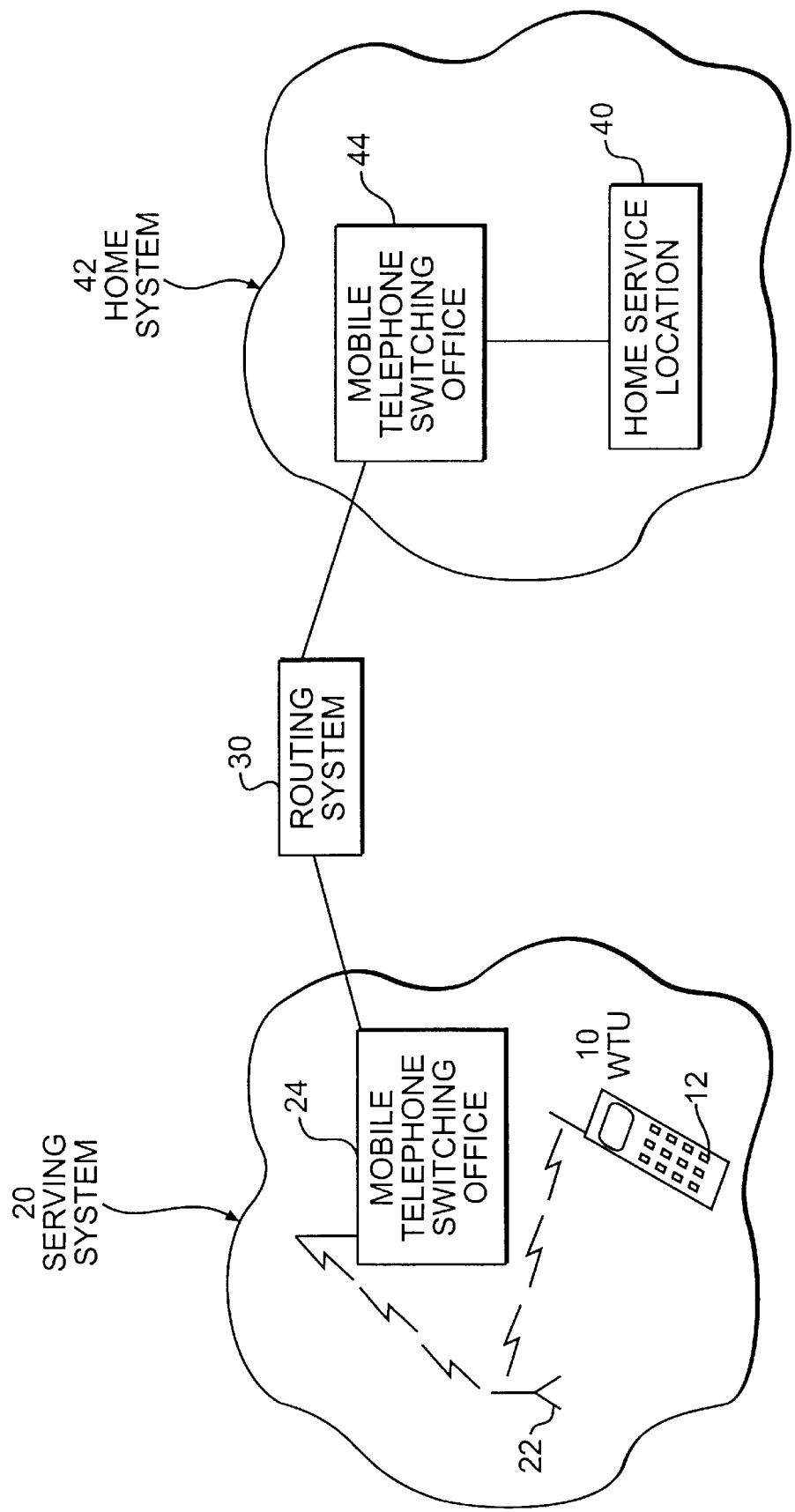
FIG. 1 is a diagram depicting a preferred embodiment of a system for a routing wireless telecommunications call.

Reference will now be made in detail to the present preferred embodiments of the invention, examples of which are illustrated in the accompanying drawings, wherein like reference numerals indicate like elements throughout the several views.

System for Routing A Wireless Telecommunications Call

FIG. 1 depicts a preferred embodiment of a system, comprising a combination of elements, for routing a wireless telecommunications call. The system includes a wireless telecommunications unit ("WTU"), a telecommunications system serving the WTU, a routing system, and means for establishing an end-to-end communications path between the WTU and the home service location. The WTU has means for inputting a predetermined code and means for transmitting a signal corresponding to the predetermined code and WTU identification information associated with the WTU that also associates the WTU with a home service location. The telecommunications system serving the WTU has means for receiving the signal transmitted by the WTU and means, responsive to that signal, for transmitting the WTU identification information to a routing system. The routing system includes means for receiving the WTU identification information and means for evaluating the WTU identification information according to predetermined criteria. The system of the present invention also includes means, responsive to the evaluating means of the routing system, for establishing an end-to-end communications path between the WTU and the home service location.

The WTU

In the preferred embodiment depicted in FIG. 1, the WTU 10, is a portable two-way radio telecommunications subscriber unit. WTU 10 may be equipped to operate in a cellular mobile telecommunications system, a personal communications system, an extended specialized mobile radio system, or other system known in the art for providing wireless telecommunications. WTU 10 may be equipped to transmit and receive voice communications, data communications, or both. In preferred embodiments not depicted in FIG. 1, the WTU may be a transportable wireless telecommunications unit, or a wireless telecommunications unit mounted in a vehicle. In other preferred embodiments not depicted in FIG. 1, the WTU may be located at a fixed location temporarily or permanently.

As depicted in FIG. 1, the means for inputting a predetermined code into WTU 10 comprise keys 12 on the face of WTU 10. In alternative embodiments, the means for inputting the predetermined code may comprise keys located elsewhere on WTU 10, voice recognition means in connection with WTU 10, or other means known in the art for inputting information into a wireless telecommunications unit.

The predetermined code is a code to be input into the WTU in order to signal that the user of the WTU desires to call a service location. In a preferred embodiment, the predetermined code is the symbol *611, and is the number recognized by at least the telecommunications system serving WTU 10 for calls for service from roamers. Such service could include, by way of example, assistance with dialling patterns in order to make calls of various types such as calls to other users of the telecommunications system serving the WTU and calls to users of other telecommunications systems; assistance with service options and preferences; assistance with the use and operation of the WTU equipment; assistance with charges and billing for wireless telecommunications services; assistance with fraud control; assistance with access to various telecommunications and information services; information on services, features, charges and billing; information on the reasons for service limitations or denial; or any other reason why a user of a wireless telecommunications unit might want or need to reach a home service location.

In a preferred embodiment, the same predetermined code is widely used in wireless telecommunications systems, so that users only need to remember and use a single predetermined code regardless of the wireless telecommunications system serving the WTU.

In alternate preferred embodiments, the predetermined code may *711, *811, #611, #711, or #811. In further alternate preferred embodiments, the predetermined code may be any four symbols, where each symbol corresponds to a key on WTU 10. In other alternate preferred embodiments, the predetermined code may be a plurality of symbols, where each symbol corresponds to a key on WTU 10.

In the preferred embodiment depicted in FIG. 1, WTU 10 is equipped with radio transmitting and receiving means, such as a radio transceiver or other wireless telecommunications technology known in the art, which provides means for generating a signal corresponding to the predetermined code and to WTU identification information associated with WTU 10, and means for transmitting that signal. The means for generating such a signal are known in the art. The WTU identification information associates WTU 10 with a home service location, and preferably is designed to identify WTU 10 uniquely. In a cellular mobile telecommunications system, for example, the WTU identification information could be the mobile identification number of WTU 10. In other wireless telecommunications services, conventions have been developed for identifying subscriber units, and these conventions could provide the basis for developing WTU identification information for each WTU in such other services.

Telecommunications System Serving the WTU

In the preferred embodiment depicted in FIG. 1, the telecommunications system serving WTU 10 is serving system 20. As depicted in FIG. 1, serving system 20 is a wireless telecommunications system including base station 22 and mobile telephone switching office 24. As depicted in FIG. 1, base station 22 communicates by radio with WTU 10 and with mobile telephone switching office 24. Base station 22 provides the means for receiving the signal transmitted by WTU 10 corresponding to the predetermined code and the WTU identification information associated with WTU 10. Base station 22 also provides means for transmitting that signal to mobile telephone switching office 24; such means may be radio links, wireline links or a combination of such links or other means known in the art for establishing communications between telecommunications base stations and switching offices.

In the preferred embodiment depicted in FIG. 1, mobile telephone switching office 24 also provides means, responsive to the signal transmitted by WTU 10 via base station 22 corresponding to the predetermined code and the WTU identification information, for transmitting the WTU identification information to a routing system. Such transmitting means may include wire, cable, fiber optic or other wireline communications technology; satellite, microwave or other wireless technology; or any combination of these or other technologies known in the art for establishing communications paths between telecommunications systems. In an alternate preferred embodiment, mobile telephone switching office 24 also includes telecommunications switching means, including switches, processors and other technology known in the art for establishing telecommunications paths between different wireless telecommunications units, and paths between wireless telecommunications units and other telecommunications systems interconnected with the telecommunications switching means. As depicted in FIG. 1, in a preferred embodiment, when the signal corresponding to the predetermined code and the WTU identification information is transmitted by WTU 10 an originating communications path is established between WTU 10 and the telecommunications switching means provided by mobile telephone switching office 24. This originating communications path includes an intermediate communications path between WTU 10 and base station 22. In an alternate preferred embodiment, a communications path is established directly between WTU 10 and mobile telephone switching office 24 or other telecommunications switching facilities of serving system 20.

In a preferred embodiment, serving system 20 includes digital computer means or other means known in the art for determining, by evaluating the WTU identification information, whether serving system 20 is the home telecommunications for WTU 10, or whether WTU 10 is roaming—that is, operating in a telecommunications system other than the home system of WTU 10. If serving system 20 determines that it is the home system of WTU 10, then serving system 20 would for example route the call from WTU 10 for service to the service location for subscribers of serving system 20. If, on the other hand, serving system 20 determines that it is not the home system of WTU 10, then, in a preferred embodiment, serving system 20 would transmit the WTU identification information to a routing system.

In an alternate preferred embodiment, serving system 20 routes all calls with the predetermined code—including those made by for whom serving system 20 is a home system—to the routing system. In essence, the serving system would be treating all calls with the predetermined code as calls from roamers. Calls with the predetermined code from a wireless telecommunications unit for which serving system 20 is a home system would then be routed by the routing system to the home service location associated with that wireless telecommunications unit.

In an alternate embodiment not depicted in FIG. 1, base station 22 receives the signal transmitted by WTU 10 corresponding to the predetermined code and the WTU identification information, and, responsive to that signal, transmits a signal corresponding to the WTU identification information directly to a routing system. In other alternate embodiments not depicted in FIG. 1, the means for receiving the signal transmitted by the WTU and the means for transmitting the WTU identification information to the routing system may comprise a space satellite system or other communications technology known in the art for receiving signals transmitted by wireless telecommunications units and, responsive to those signals, transmitting them to a routing system.

In an alternate preferred embodiment, serving system 20, responsive to the predetermined code, transmits the predetermined code and the WTU identification information to the routing system. The user of WTU 10 thus could signal the routing system, via serving system 20, to route the call to different home service locations, depending on the predetermined code.

The Routing System

In a preferred embodiment depicted in FIG. 1, the routing system is routing system 30, and includes means for receiving the WTU identification transmitted by mobile telephone switching office 24 of serving system 20, and means for evaluating the WTU identification information according to predetermined criteria. The routing system 30 means for receiving the WTU identification information may include telecommunications receivers known in the art for receiving telecommunications transmissions, depending on the technology used to establish a communications path between mobile telephone switching office 24 of serving system 20 and routing system 30.

The routing system 30 means for evaluating the WTU identification information according to predetermined criteria may comprise digital computers or other technology known in the art for such functions. In the preferred embodiment depicted in FIG. 1, the evaluation means in routing system 30 may evaluate the WTU identification according to whether WTU 10 is subscribed to a telecommunications system with which routing system 30 is connected for the purpose of routing wireless calls with the predetermined code to a home service location. The evaluation means of routing system 30 preferably searches a database to determine the home service location associated with WTU 10. In the preferred embodiment depicted in FIG. 1, the evaluation means of routing system 30 determines whether WTU 10 is associated with home service location 40, and, if so determines the means for establishing an end-to-end path between WTU 10 and home service location 40.

In the preferred embodiment depicted in FIG. 1, home service location 40 is associated with a home telecommunications system, depicted in FIG. 1 as home system 42 having mobile telephone switching office 44. In this embodiment, routing system 30 determines that WTU 10 is associated with home system 42, and includes means for establishing a communications path between routing system 30 and mobile telephone switching office 44 and interconnecting that path with a communications path between mobile telephone switching office 44 and routing system 30. In a preferred embodiment not depicted in FIG. 1, the routing system, responsive to an evaluation of the WTU identification information (and other information such as the predetermined code transmitted to the routing system), signals the telecommunications serving the WTU to establish a communications path between the WTU and the home service location that does not utilize any routing system facilities. With reference to FIG. 1, as an example of this embodiment, routing system 30 would, responsive to WTU identification information transmitted by mobile telephone switching office 24, signal mobile telephone switching office 24 to establish a direct communications path between mobile telephone switching office 24 and mobile telephone switching office 44. In such embodiments, routing system 30 functions primarily as a database that is queried by appropriate facilities of serving system 20 in order to ascertain how the same or other facilities of serving system 20 should route the call.

In a preferred embodiment, the routing system also comprises means for signalling the telecommunications system serving the WTU of the evaluation of the WTU identification information according to the predetermined criteria. For example, in the preferred embodiment depicted in FIG. 1, routing system 30 would signal serving system 20 whether WTU 10 is associated with a home service location for which routing system 30 is able to establish an end-to-end path with WTU 10. If, for example, routing system 30 were not able to establish such an end-to-end path, then it would so signal serving system 20, which could then in turn perform a variety of functions, such as signalling WTU 10 that the call for service could not be completed, or routing the call to a service location associated with serving system 20. In an alternate preferred embodiment, if routing system 30 is not able to establish the end-to-end communications path, routing system 30 signals serving system 20 to signal WTU 10 to input additional information in order to enable routing system 30 to perform its functions.

In the preferred embodiment depicted in FIG. 1, serving system 20 serves a geographic area, and routing system 30 is located outside that geographic area. In an alternate preferred embodiment not depicted in FIG. 1, the routing system may be located within the geographic area served by serving system 20. In another alternative embodiment, for example, the signal transmitted by WTU 10 corresponds to an 800 or other toll-free number associated with home service location 40, and mobile telephone switching office 24 queries a database in order to translate that toll-free number to a regular telephone number corresponding to home service location 40, to which it routes the call from WTU 10 for service.

Home Service Location

In the preferred embodiment depicted in FIG. 1, the home service location is home service location 40. In this preferred embodiment, home service location 40 is associated with a home telecommunications system. This home telecommunications system would be the system to which WTU 10 is regularly subscribed for service, and may for example bill a designated customer for usage by WTU 10 of services provided by its home telecommunications system, as well as for example services provided by other telecommunications providers with which home system 42 has a billing and collection arrangement. In a preferred embodiment, home service location 40 would be equipped to provide service to a user of WTU 10, including, for example, information on the wireless service options selected by the user; information on the features such as call-waiting, call-forwarding and conference-calling utilized by the user; information on the user's arrangements with long distance and other telecommunications services to be used in connection with the user's wireless telecommunications services; information on the operation of WTU 10; information on the user's credit; information and access to services in the foreign market in which WTU 10 is operating (such as how to reach emergency medical or public safety services); information on and access to other telecommunications and information services offered through the foreign system or otherwise; information on the coverage of the foreign system serving WTU 10; information on service limitations or denials imposed by the foreign system in which WTU 10 is operating; implementation of service restrictions or termination desired by the user of WTU 10; and any other services or information that would prompt a user of WTU 10 to call a service or information location. Home service location 40 could include automated answering devices, human operators and other means known in the art for providing service and information to users of telecommunications services.

As depicted in FIG. 1, the home telecommunications system of WTU 10 is home system 42. As further depicted in FIG. 1, home service location 40 is located within the geographic service area of home telecommunications service 42. In an alternate embodiment not depicted in FIG. 1, home service location 42, while associated with home system 42, is located outside the geographic service area served by home system 42. In another alternate embodiment, home service location 40 may not be associated with any telecommunications system, but may rather be an independent service location that has information, for example as a result of contractual arrangements, sufficient to provide service or information to the user of WTU 10. Thus, for example, routing system 30 could route a call from WTU 10 to different service locations, depending on the predetermined code input into WTU 10 and the information transmitted from serving system 20 to routing system 30. As another example, routing system 30 could provide for different routings of a call from WTU 10 to the same home service location depending on any number of factors, such as the time of day and traffic volumes on particular communications paths. As a further example, based on the WTU identification information of each wireless telecommunications unit, routing system 30 could provide different routings for calls to the same home service location from different wireless telecommunications units operating in the same foreign telecommunications system, again depending on relevant call routing factors and service priorities and billing arrangements associated with individual wireless telecommunications units.

Communications Paths

In the preferred embodiment depicted in FIG. 1, an end-to-end communications path is established, responsive to the evaluating means of routing system 30, between WTU 10 and home service location 40. In a preferred embodiment, the end-to-end communications path would comprise an originating communications path between WTU 10 and telecommunications switching means of serving system 20, as well as a home-service communications path between the telecommunications switching means of serving system 20 and home service location 40. As indicated above, these communications paths could be established using any technology or combination of technologies known in the art for establishing communications paths.

As depicted in FIG. 1, the end-to-end communications path comprises an originating communications path between WTU 10 and mobile telephone switching office 24, via base station 22, both of serving system 20. As also depicted in FIG. 1, the end-to-end communications path comprises a home-service path between mobile telephone switching office 24 of service system 20 and home service location 40.

In a preferred embodiment in which the home service location is associated with a home telecommunications system, the home-service communications path may comprise an intersystem communications path between the system serving WTU 10 and the home telecommunications system. In the preferred embodiment depicted in FIG. 1, an intersystem communications path is established, responsive to the evaluation by routing system 30 of the WTU identification information, via routing system 30 between mobile telephone switching office 24 of serving system 20 and mobile telephone switching office 44 of home system 42, as part of the end-to-end communications path. In such an embodiment, the end-to-end communications path between WTU 10 and home service location 40 also includes a terminating communications path between mobile telecommunications switching office 44 and home service location 40. The configuration and technology of a terminating communications path would be selected based on factors known in the art depending on the configuration, location and functions of home service location 40 and the facilities used in home system 42.

In another preferred embodiment, a home-system communications path includes a first routing-system path between the telecommunications system serving WTU 10 and the routing system, and a second routing-system path between the routing system and the home telecommunications system, and the routing system includes switching means for interconnecting the first routing-system path and the second routing-system path. In the preferred embodiment depicted in FIG. 1, for example, in order to establish an end-to-end communications path between WTU 10 and service location 40, in response the evaluation by routing system 30 of the WTU identification information, an originating communications path is established between WTU 10 and mobile telephone switching office 24, via base station 22 of serving system 20; a first routing-system communications path is established between mobile telephone switching office 24 and routing system 30; a second routing-system communications path would be established between routing system 30 and mobile telephone switching office 44 of home system 42; and a terminating communications path would be established between mobile telephone switching office 44 and home service location 40.

Location Signalling

In a further preferred embodiment, the system for routing wireless telecommunications calls of the present invention also includes means for providing a home service location with additional information, such as the identity of serving system 20 and the geographic location of WTU 10. By providing such information to the home service location, the system of this embodiment provides the home service location with additional capability to respond to needs and questions of the user of the WTU. The user may, for example, need information on the availability and price of various services of the wireless telecommunications system serving the WTU, or the dialing patterns required to use those services, and knowledge of the system serving the WTU or the geographic location of the WTU, or both, would facilitate the provision of this dialling pattern information.

In the preferred embodiment depicted in FIG. 1, mobile telephone switching office 24 transmits information identifying serving system 20 to routing system 30 contemporaneously with the transmission of the WTU identification information to routing system 30. Responsive to the evaluation of the WTU identification information by routing system 30, routing system 30 also transmits the information identifying serving system 20 to mobile telephone switching office 44, which passes it on to home service location 44 along with the WTU identification information. Means for identifying serving system 20 are known in the art, and include by way of example dialed number information and toll-free number information associated with serving system 20 when a communications path is established between serving system 20 and routing system 30. Home service location 40 is thus informed that serving system 20 is serving WTU 10, and can also use this information to determine the approximate geographic location of WTU 10. In an alternate embodiment, mobile telephone switching office 24 determines that an originating communications path has been established between WTU 10 and base station 22, and signals routing system 30 with the identity of base station 22 and its geographic location. This geographic location information is transmitted to home service location 40 via a home-service communications path, such as depicted in FIG. 1, so that home service location 40 has more precise information on the location of WTU 10. In another preferred embodiment not depicted in FIG. 1, WTU 10 signals a geographic position determination system using global satellite positioning or other position determining technology, which signals home service location 40, either directly or indirectly, with a precise geographic location of WTU 10.

Method for Routing a Wireless
Telecommunications Call

Figure 2:
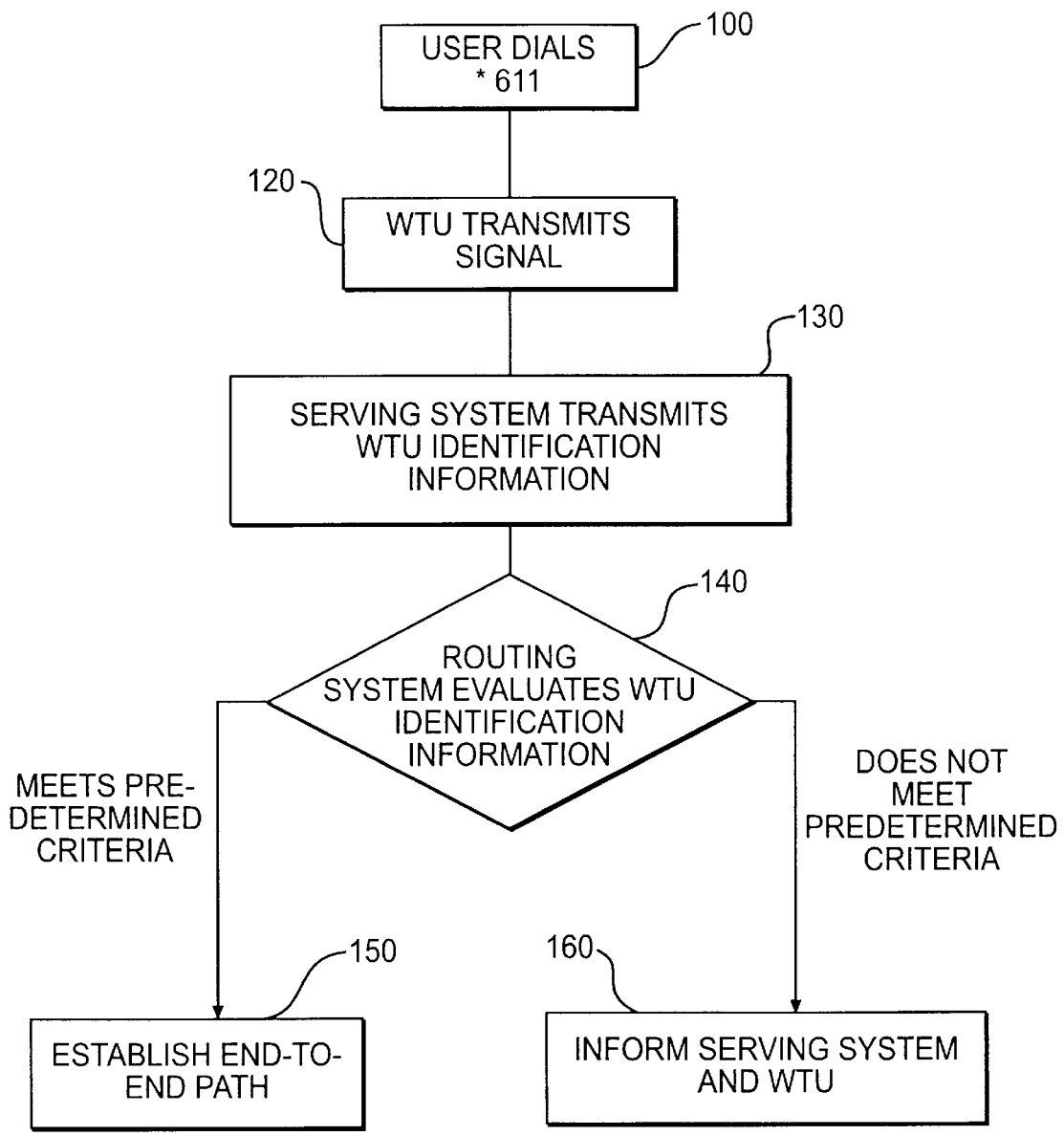
FIG. 2 is a flow chart depicting a preferred embodiment of a method for routing a wireless telecommunications call.

FIG. 2 depicts a flow chart of a preferred embodiment of a method for routing a wireless telecommunications call. The method includes the steps of inputting a predetermined code into a WTU; transmitting, from the WTU to a telecommunications system serving the WTU, a signal corresponding to the predetermined code and WTU identification information associated with the WTU that also associates the WTU with a home service location; transmitting, responsive to the signal, the WTU identification information to a routing system; evaluating the WTU identification information according to predetermined criteria; and establishing, if the WTU identification information meets the predetermined criteria, an end-to-end communications path between the WTU and the home service location.

In the preferred embodiment depicted in FIG. 2, the inputting step is accomplished by the user dials *611 step 100. This step would be accomplished using a WTU, such as WTU 10 depicted in FIG. 1 or other wireless telecommunications units known in the art. As described above with reference to FIG. 1, the predetermined code *611 preferably is widely known and used for calls by subscribers for calls for service or information. As also described with reference to FIG. 1, other predetermined codes may be used.

In the preferred embodiment depicted in FIG. 2, the WTU transmits signal step 120 accomplishes the step of transmitting, from the WTU to a telecommunications system serving the WTU, a signal corresponding to the predetermined code and WTU identification information associated with the WTU that also associates the WTU with a home service location. The conversion from the predetermined code to a signal corresponding to that code and the WTU identification information is accomplished by wireless telecommunications unit technology known in the art. The WTU identification associates the WTU with a home service location. As described above in connection with FIG. 1, the WTU identification information may also uniquely identify the WTU as well as the home telecommunications system associated with the WTU.

The WTU transmits signal step 120 is accomplished using wireless telecommunications technology known in the art, including by way of example WTU 10 and base station 22 and mobile telephone switching office 24 of serving system 20 depicted in FIG. 1. Alternatively, satellite or other technologies known in the art may be used, including technologies discussed above in connection with FIG. 1 for transmitting signals from a WTU to a telecommunications system serving the WTU.

The step of transmitting, responsive to the signal transmitted by the WTU, the WTU identification information to a routing system is accomplished, in the preferred embodiment depicted in FIG. 2, in step 130, in which the serving system transmits WTU identification information. This transmitting step 130 may be realized through the use of mobile telephone switching office 24 and routing system 30 depicted in FIG. 1, or through other technologies known in the art for transmitting signals between telecommunications systems and routing systems. As described above, in connection with FIG. 1 such technologies would receive the signal transmitted by the WTU corresponding to the predetermined code and the WTU identification information, and, responsive to that signal, transmit the WTU identification information to the routing system.

In the preferred embodiment depicted in FIG. 2, the step of evaluating the WTU identification information according to predetermined criteria is undertaken at the evaluate WTU identification information step 140. This evaluation may be undertaken at routing system 30 or mobile telephone switching office 24 depicted in FIG. 1, or at another facility or facilities where technology for performing such evaluations may be located. In a preferred embodiment, this evaluate WTU identification information step 140 utilizes a computerized database to determine whether the WTU is subscribed to a wireless telecommunications system with which the routing system is able to establishing a communications path so that the call for service from the WTU may be routed to the home telecommunications system of the WTU.

In the preferred embodiment in a cellular mobile telephone system, the WTU is a cellular mobile unit, the routing system is operated by an interexchange carrier and the WTU identification information is the Mobile Identification Number ("MIN") of the cellular mobile unit. The routing system checks the MIN against a database including the ranges of MINs of wireless telecommunications systems with which the interexchange carrier has agreements to handle calls from roaming cellular subscribers using the predetermined code to reach a home service location associated with their home telecommunications system. If the MIN falls within these ranges, then the WTU identification information would meet the predetermined criteria.

In a further preferred embodiment, as discussed above in connection with FIG. 1, if the WTU identification information meets the predetermined criteria, then the routing system also determines the means for establishing an end-to-end path between the WTU and the home service location.

In the preferred embodiment depicted in FIG. 2, if the WTU identification information meets the predetermined criteria, then the establish end-to-end path step 150 accomplishes the step of establishing an end-to-end communications path between the WTU and the home service location associated with the WTU. As depicted in FIG. 1, this end-to-end communications path is comprised of interconnected paths between WTU 10 and base station 22 of serving system 20, between base station 22 and mobile telephone switching office 24 of serving system 20, between mobile telephone switching office 24 and routing system 30, between routing system 30 and mobile telephone switching office 44 of home system 42, and between mobile telephone switching office 44 and home service location 40. As described above in connection with FIG. 1, other technologies known in the art may be used to establish an end-to-end communications path between the WTU and the home service location.

In the preferred embodiment depicted in FIG. 2, if the WTU identification information does not meet the predetermined criteria, then the inform serving system and WTU step 160 is undertaken. Functionally, the call is returned to the telecommunications system serving the WTU, for example for handling by service personnel or facilities of that telecommunications system.

In a further preferred embodiment, the serving system transmits WTU identification information step 130 also includes the step of transmitting additional information, such as the identity of the telecommunications system serving the WTU, or the geographic location of the WTU, or both. In this preferred embodiment, if the WTU identification information meets the predetermined criteria, this additional information would also be transmitted to the home service location, thereby providing personnel and facilities at the home service location with potentially important information in responding to the call from the WTU to the home service location. Technologies for implementing the step of transmitting additional information are known in the art and include the technologies for this purpose described in connection with FIG. 1.

The establish end-to-end path step 150 depicted in FIG. 2 may also include the establishment of various interconnected communications paths which together form an end-to-end communications path. For example, the establish end-to-end path step 150 may include establishing an originating communications path between the WTU and telecommunications switching means of the telecommunications system serving the WTU, and a home-service communications path, interconnected with the originating communications path, between the telecommunications switching means of the telecommunications system serving the WTU and the home service location. The home-service communications path may in turn comprise a series of interconnected communications paths, for example an intersystem communications path between the telecommunications switching means of the system serving the WTU and telecommunications switching means of a home telecommunications system with which the home service location is associated; and a terminating communications path between the telecommunications switching means of the home system and the home service location. In an alternative embodiment, such as depicted in FIG. 1, the intersystem communications path comprises a first routing-system path between the telecommunications switching means of the telecommunications system serving the WTU and the routing system, interconnected with a second routing-system communications path between the routing system and the telecommunications switching means of the home telecommunications system.

It will be apparent to those skilled in the art that various modifications can be made to this invention of a system and method for routing a wireless telecommunications call, without departing from the scope or spirit of the invention. It is also intended that the present invention cover modifications and variations of the system and method for routing a wireless telecommunications call within the scope of the appended claims and their equivalents.

I claim:

1. A system for routing a wireless telecommunications call, comprising:

a wireless telecommunications unit ("WTU") having means for inputting a predetermined code, and
means for transmitting a signal corresponding to the predetermined code and WTU identification information associated with the WTU,
wherein the WTU identification information also associates the WTU with a home service location; and
a telecommunications system serving the WTU having means for receiving the signal transmitted by the WTU, and
means, responsive to the signal transmitted by the WTU, for transmitting the WTU identification information to a routing system,
wherein the routing system includes
means for receiving the WTU identification information,
means for evaluating the WTU identification information according to predetermined criteria, wherein the evaluating means identifies the home service location; and
means, responsive to the evaluating means of the routing system, for establishing an end-to-end voice communications path between the WTU and the home service location; and
wherein the transmission by the WTU of the signal corresponding to the predetermined code initiates the establishment of the end-to-end voice communications path.

2. The system as set forth in claim 1, wherein the predetermined code comprises a plurality of symbols.

3. The system as set forth in claim 2, wherein each of the plurality of symbols corresponds to a key on the WTU.

4. The system as set forth in claim 2, wherein the plurality of symbols comprises four symbols.

5. The system as set forth in claim 4, wherein the four symbols comprise *611.

6. The system as set forth in claim 4, wherein the four symbols comprise *711.

7. The system as set forth in claim 4, wherein the four symbols comprise *811.

8. The system as set forth in claim 4, wherein the four symbols comprise #611.

9. The system as set forth in claim 4, wherein the four symbols comprise #711.

10. The system as set forth in claim 4, wherein the four symbols comprise #811.

11. The system as set forth in claim 1, wherein the predetermined code comprises a plurality of words.

12. The system as set forth in claim 1, wherein the telecommunications system serving the WTU further comprises:
   telecommunications switching means; and
   transmitting and receiving means for establishing an originating voice communications path between the WTU and the telecommunications switching means.

13. The system as set forth in claim 12, wherein the telecommunications system serving the WTU further comprises a base station and the transmitting and receiving means of the telecommunications system serving the WTU comprises means for establishing an intermediate voice communications path between the WTU and the base station.

14. The system as set forth in claim 1 further comprising means, responsive to the evaluating means of the routing system, for signalling the telecommunications system serving the WTU with an evaluation of the WTU identification information according to the predetermined criteria.

15. The system as set forth in claim 1, wherein the telecommunications system serving the WTU serves a geographic area, and the routing system is located within the geographic area.

16. The system as set forth in claim 1, wherein the telecommunications system serving the WTU serves a geographic area, and routing system is located outside the geographic area.

17. The system as set forth in claim 1, wherein the telecommunications system serving the WTU comprises telecommunications switching means, and wherein the end-to-end voice communications path comprises an originating voice communications path between the WTU and the telecommunications switching means.

18. The system as set forth in claim 1, wherein the end-to-end voice communications path comprises a home-service voice communications path between the telecommunications system serving the WTU and the home service location.

19. The system as set forth in claim 18, wherein the WTU identification information associates the WTU with a home telecommunications system associated with the home service location, and wherein the home-service voice communications path comprises an intersystem voice communications path between the telecommunications system serving the WTU and the home telecommunications system.

20. The system as set forth in claim 19, wherein the home-service voice communications path comprises a terminating voice communications path between the home telecommunications system and the home service location.

21. The system as set forth in claim 18,
   wherein the home-service voice communications path comprises a first routing-system voice communications path between the telecommunications system serving the WTU and the routing system and a second routing-system voice communications path between the routing system and the home service location; and
   wherein the routing system further comprises switching means for interconnecting the first routing-system voice communications path and the second-routing system voice communications path.

22. The system as set forth in claim 1, wherein the WTU identification information associates the WTU with a home telecommunications system associated with the home service location.

23. The system as set forth in claims 19, 20, 21 or 22, wherein the home service location is located within a geographic area served by the home telecommunications system.

24. The system as set forth in claims 19, 20, 21 or 22, wherein the home service location is located outside a geographic area served by the home telecommunications system.

25. The system as set forth in claim 1, further comprising means for signalling the home service location with additional information concerning the WTU.

26. The system as set forth in claim 25, wherein the additional information signalling means comprises means for signalling the home service location with information identifying the telecommunications system serving the WTU.

27. The system as set forth in claim 25, wherein the additional information signalling means comprises means for signalling the home service location with information relating to the geographic location of the WTU.

28. The system as set forth in claim 25, wherein the additional information signalling means comprises means for signalling the home service location with information identifying the a telecommunications switching facility included in the telecommunications system serving the WTU.

29. The system as set forth in claim 25, wherein the additional information signalling means comprises means for signalling the home service location with information identifying a base station included in the telecommunications system serving the WTU.

30. The system as set forth in claim 1, further comprising geographic locator means for signalling the home service location with a precise location of the WTU.

31. A system for routing a wireless telecommunications call, comprising:
   a wireless telecommunications unit ("WTU") having
      means for inputting a predetermined code, and
      means for transmitting a signal corresponding to the predetermined code and WTU identification information associated with the WTU,
      wherein the WTU identification information in combination with the predetermined code associates the WTU with a home service location; and
   a telecommunications system serving the WTU having
      means for receiving the signal transmitted by the WTU, and
      means, responsive to the signal transmitted by the WTU, for transmitting the WTU identification information and the predetermined code to a routing system,
      wherein the routing system includes means for receiving the WTU identification information and the predetermined code,
means for evaluating the WTU identification information and the predetermined code according to predetermined criteria, wherein the evaluating means identifies the home service location; and
means, responsive to the evaluating means of the routing system, for establishing an end-to-end voice communications path between the WTU and the home service location; and
wherein the transmission by the WTU of the signal corresponding to the predetermined code initiates the establishment of the end-to-end voice communications path.

32. A method of routing a wireless telecommunications call, comprising the steps of:
inputting a predetermined code into a wireless telecommunications unit ("WTU");
transmitting, from the WTU to a telecommunications system serving the WTU, a signal corresponding to the predetermined code and WTU identification information associated with the WTU, wherein the WTU identification information also associates the WTU with a home service location;
transmitting, responsive to the signal transmitted by the WTU, the WTU identification information to a routing system;
evaluating the WTU identification information according to predetermined criteria and identifying the home service location in response to such evaluation; and
establishing, if the WTU identification information meets the predetermined criteria, an end-to-end voice communications path between the WTU and the home service location wherein the signal transmitted by the WTU corresponding to the predetermined code initiates the establishment of the end-to-end voice communications path.

33. The method as set forth in claim 32, wherein the predetermined code comprises a plurality of symbols.

34. The method as set forth in claim 33, wherein each of the plurality of symbols corresponds to a key on the WTU.

35. The method as set forth in claim 33, wherein the plurality of symbols comprises four symbols.

36. The method as set forth in claim 34, wherein the four symbols comprise *611.

37. The method as set forth in claim 34, wherein the four symbols comprise *711.

38. The method as set forth in claim 34, wherein the four symbols comprise *811.

39. The method as set forth in claim 34, wherein the four symbols comprise #611.

40. The method as set forth in claim 34, wherein the four symbols comprise #711.

41. The method as set forth in claim 34, wherein the four symbols comprise #811.

42. The method as set forth in claim 32, wherein the predetermined code comprises a plurality of words.

43. The method as set forth in claim 32, further comprising the step of signalling the wireless telecommunications system serving the WTU with the results of the evaluating step.

44. The method as set forth in claim 32, wherein the telecommunications system serving the WTU serves a geographic area, and the routing system is located within the geographic area.

45. The method as set forth in claim 32, wherein the telecommunications system serving the WTU serves a geographic area, and the routing system is located outside the geographic area.

46. The method as set forth in claim 32, wherein the step of establishing the end-to-end voice communications path further comprises the step of establishing an originating voice communications path between the WTU and telecommunications switching means of the telecommunications system serving the WTU.

47. The method as set forth in claim 32, wherein the step of establishing the end-to-end voice communications path further comprises the step of establishing a home-service voice communications path between the telecommunications system serving the WTU and the home service location.

48. The method as set forth in claim 47, wherein the WTU identification information associates the WTU with a home telecommunications system associated with the home service location, and wherein the home-service voice communications path comprises and intersystem voice communications path between the telecommunications system serving the WTU and the home telecommunications system.

49. The method as set forth in claim 48, wherein the step of establishing the home-service voice communications path further comprises the step of establishing a terminating voice communications path between the home telecommunications system and the home service location.

50. The method as set forth in claim 47, wherein the step of establishing a home-service voice communications path further comprises the steps of
establishing a first routing-system voice communications path between the telecommunications system serving the WTU and the routing system; and
establishing a second routing-system voice communications path between the routing system and the home service location;
wherein the routing system further comprises switching means for interconnecting the first routing-system voice communications path and the second routing-system voice communications path.

51. The method as set forth in claim 32, wherein the WTU identification information associates the WTU with a home telecommunications system associated with the home service location.

52. The method as set forth in claim 32, wherein the home service location is located within a geographic area served by the home telecommunications system.

53. The method as set forth in claim 32, wherein the home service location is located outside of a geographic area served by the home telecommunications system.

54. The method as set forth in claim 32, further comprising the step of signalling the home service location with additional information concerning the WTU.

55. The method as set forth in claim 54, wherein the additional information signalling step comprises the step of signally the home service location with information identifying the telecommunications system serving the WTU.

56. The method as set forth in claim 54, wherein the additional information signalling step comprises the step of signalling the home service location with information identifying the telecommunications system serving the WTU.

57. The method as set forth in claim 54, wherein the additional information signalling step comprises the step of signally the home service location with information identifying a telecommunications switching facility included in the telecommunications system serving the WTU.

58. The method as set forth in claim 54, wherein the additional information signalling step comprises the step of signalling the home service location with information identifying a base station included in the telecommunications system serving the WTU.

59. The method as set forth in claim 32, further comprising the step of informing the home service location of the precise location of the WTU.

60. A method of routing a wireless voice telecommunications call, comprising the steps of:

inputting a predetermined code into a wireless telecommunications unit ("WTU")

transmitting, from the WTU to a telecommunications system serving the WTU, a signal corresponding to the predetermined code and WTU identification information associated with the WTU, wherein the WTU identification information and the predetermined code associate the WTU with a home service location;

transmitting, responsive to the signal transmitted by the WTU, the WTU identification information and the predetermined code to a routing system;

evaluating the WTU identification information and the predetermined code according to predetermined criteria and identifying the home service location in response to such evaluation; and establishing, if the WTU identification information and the predetermined code meet the predetermined criteria, an end-to-end voice communications path between the WTU and the home service location wherein the signal transmitted by the WTU corresponding to the predetermined code initiates the establishment of the end-to-end voice communications path.

* * * * *